Figure 1:
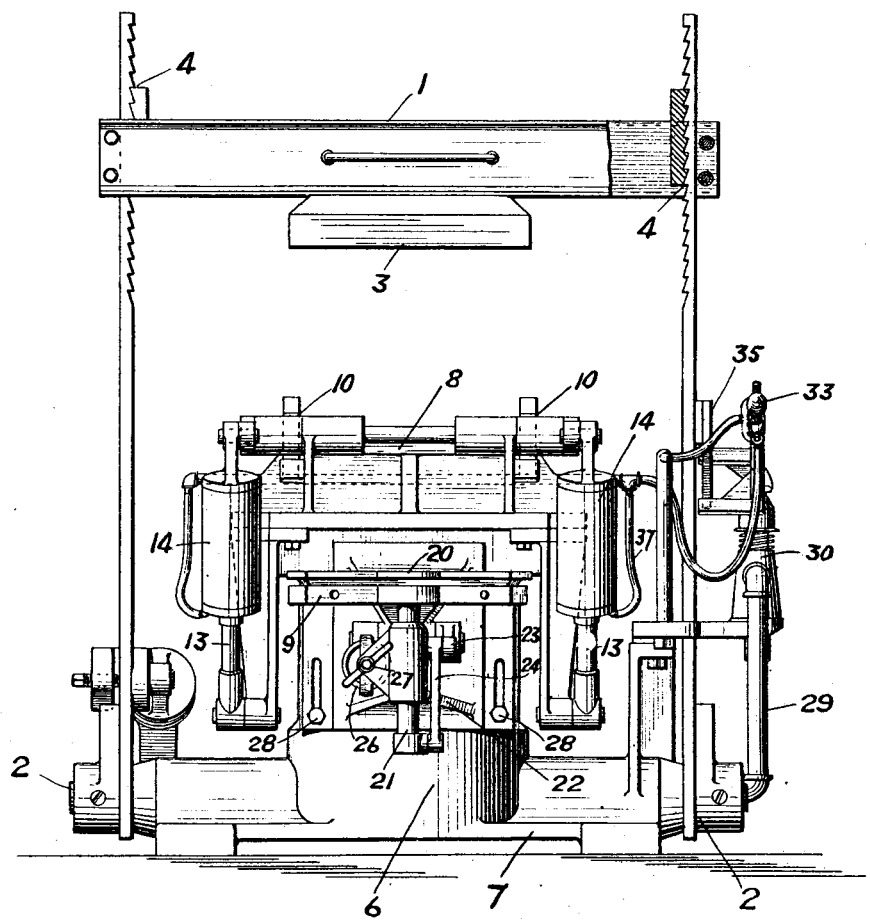

W. LEWIS.
MOLDING MACHINE.
APPLICATION FILED NOV. 13, 1909.

1,071,064.

Patented Aug. 26, 1913.
4 SHEETS—SHEET 1.

WITNESSES:

INVENTOR
Wilfred Lewis
BY
Augustus B. Stoughton,
ATTORNEY.

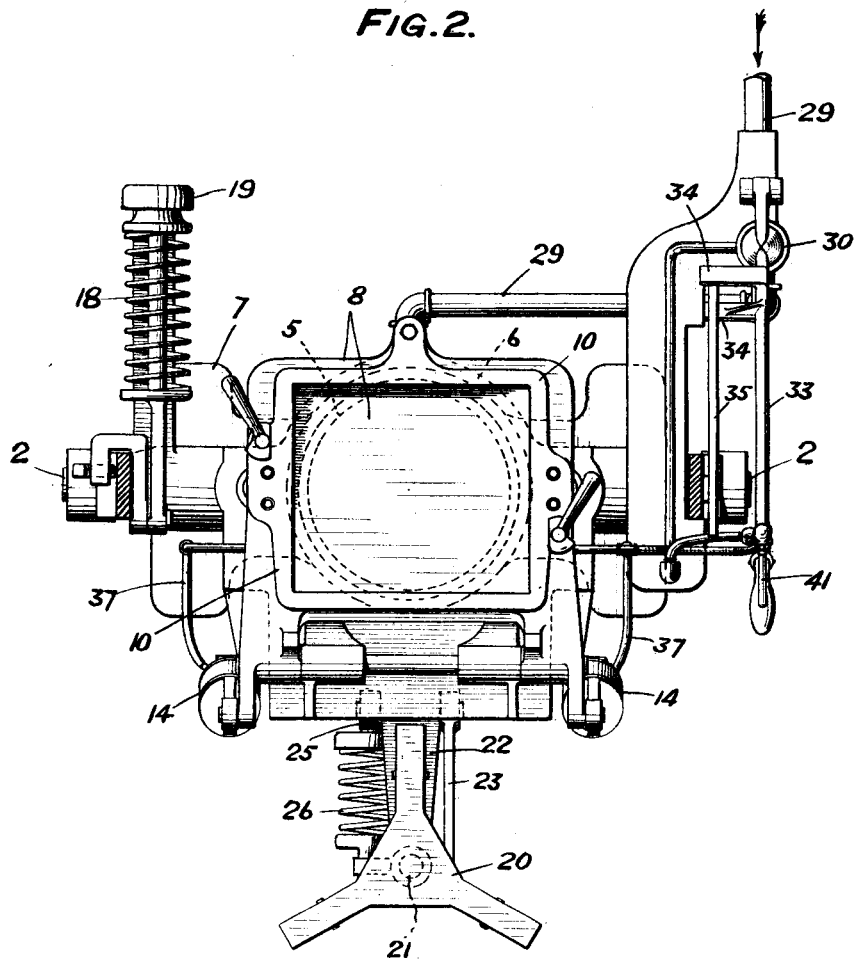

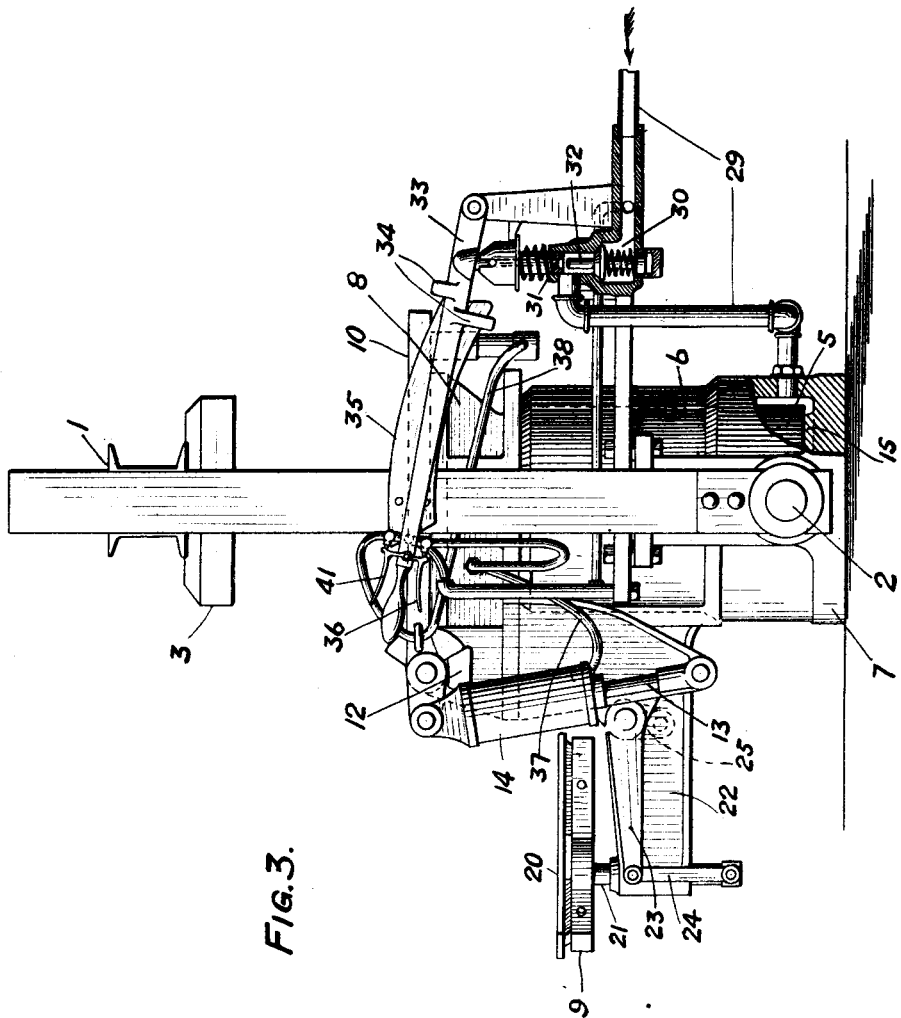

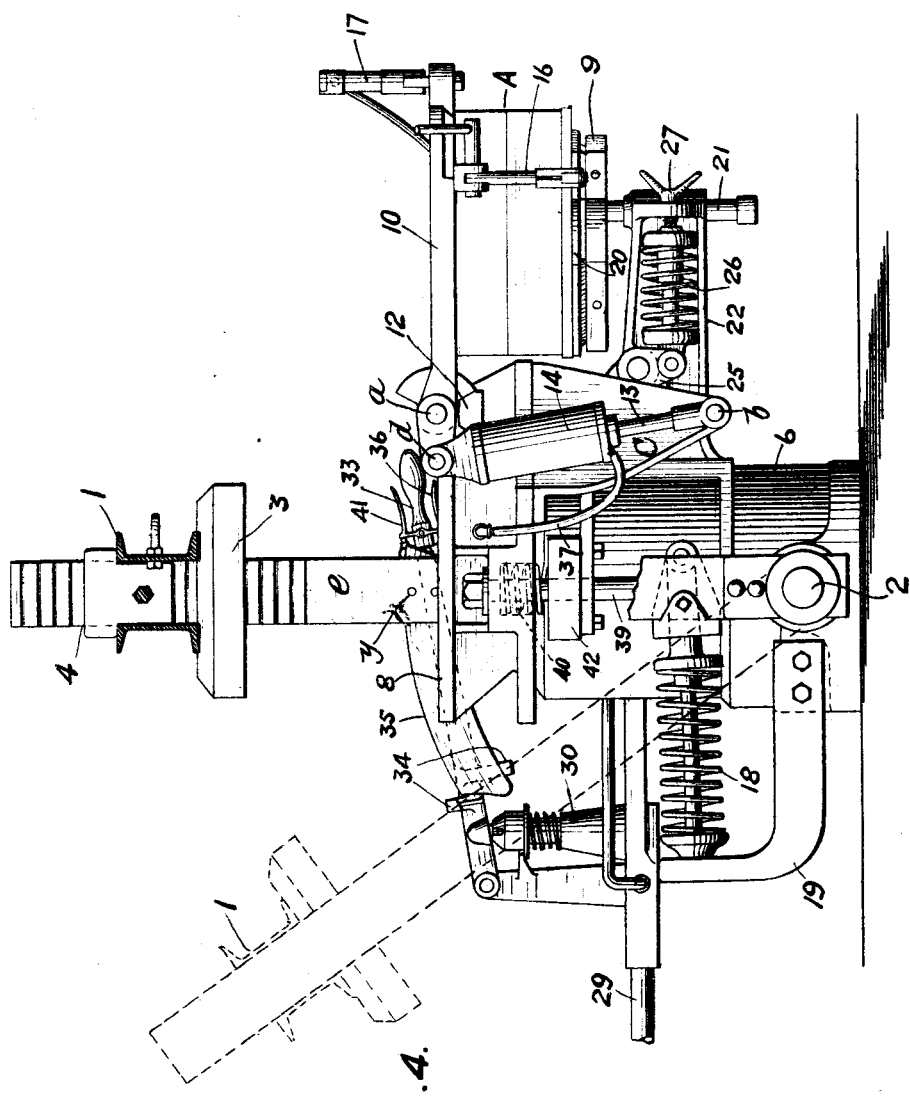

UNITED STATES PATENT OFFICE.

WILFRED LEWIS, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA.

MOLDING-MACHINE.

1,071,064.      Specification of Letters Patent.      Patented Aug. 26, 1913.

Application filed November 13, 1909. Serial No. 527,849.

*To all whom it may concern:*

Be it known that I, WILFRED LEWIS, a citizen of the United States, and a resident of Philadelphia, in the county of Philadelphia and State of Pennsylvania, have invented certain new and useful Improvements in Molding-Machines, of which the following is a specification.

The principal object of the present invention is to provide a comparatively simple, inexpensive and reliable molding machine adapted to squeeze or ram or jar and to draw patterns by power, and which is also adapted to draw comparatively deep patterns and is otherwise possessed of the advantages of a roll-over type of machine.

Other objects of the invention are to provide for adjusting the machine to the weight of the flask and also to the depth of the flask and to provide appropriate connections for operating the machine to cause it to perform its various functions.

A machine, being one embodiment of the invention, is illustrated in the accompanying drawings, in which—

Figure 1, is a front view with parts broken away. Fig. 2, is a top or plan view with the ramming head removed. Fig. 3, is a side view of the machine with parts broken away, and Fig. 4, is a view of the other side of the machine with parts broken away.

In the complete machine of this invention parts which constitute a power roll-over machine, to be presently described, are mounted on a power cylinder which squeezes, rams or jars and which also draws patterns. Throughout the following description in describing pistons and cylinders and parts carried or actuated thereby, I desire to state that I contemplate a reversal of the cylinders and pistons in relation to the parts which they carry or operate, since the functions of cylinders and pistons are interchangeable.

1. is a ramming head pivoted as at 2 and having its effective portion 3 adjustable as is indicated at 4.

5. is a piston which is movable vertically in a cylinder 6. The cylinder 6 and pivotal connections for the ramming head may be connected together by the base 7 of the machine. The upper portion of the piston 5 constitutes a flask support 8.

9, is a flask rest which is shown as connected with the cylinder 6, or with the base of the machine, although it may be otherwise connected and arranged so as to receive a flask.

10, are flask carrying arms pivoted intermediate of their length to the flask support as at *a* or to some other part connected with the piston 5 and they constitute a hinge frame.

12, are stops for positioning the arms to draw the patterns. Between the inner ends of the arms 10 and a portion of the flask support, or some other member connected with the piston 5, there are complemental pistons and piston rods 13 and cylinders 14, which serve to turn the hinge frame 10. The rod 13 is pivoted at *b* to the stand *c*, bolted to the flask support 8. The cylinders 14 are pivoted at *d* to the ends of the hinge frame 10.

In use a pattern plate and a flask A, are attached to the hinge frame 10, so that the flask by way of the pattern plate rests on the flask support 8 and piston 5 may be caused to rise so as to squeeze the contents of the flask against the ramming head 3, or, if desired, the piston may be caused to rapidly rise and ram the contents of the flask by rapidly striking the ramming head, or if desired, the piston may be caused to rise and rapidly fall, so as to jar the contents of the flask; thus the machine may be used for power squeezing, ramming or jarring. The projection 15 at the lower end of the piston 5 is useful when the machine is operated for jarring. The complemental cylinder and piston and piston rod connections 14 and 13, constitute a power device for swinging the hinge frame 10, and thus causing it to transfer the flask from the flask support, turn it over and place it on the flask rest 9. The stops 12. fix the hinge frame 10 in proper position in respect to the flask support, so that by raising the piston 5 the frame 10 ascends and draws the pattern by power.

16. is a clamp for connecting and disconnecting the flask A and hinge frame 10.

The stop 12 is shown as constructed so as to position the arms 10 both for drawing the pattern and for preventing the arms from turning too far past the part 8, if the pattern plate were removed; the first function is the important one as it is evident that the pattern plate can be readily positioned on the flask support without involving the use of a stop of this character.

17, is a vibrator which may be used in connection with the drawing of the pattern.

18, is a spring interposed between the ramming head and a suitable bracket 19, for the purpose of balancing the ramming head so that it can be readily turned into vertical position for use and out of that position to permit of the filling of the flask. The flask rest 9 is shown as provided with an adjustable cradle 20 and with a shank 21. The shank 21 works freely through an opening in a bracket 22. The bracket 22 is attached to the cylinder 6, which is a part of the base 7.

23, is a bell-crank lever journaled through the bracket 22 and having one of its arms connected by a link 24 with the shank 21 of the rest. The other arm 25 of the bell-crank lever is connected with one end of a spring 26, the tension of which can be adjusted by means of the adjusting screw 27. The purpose of this spring is to adjust the rest to the weight of the flask. The bracket 22 together with the parts which it carries may be adjusted up and down by means of the adjusting bolts 28, (Fig. 1), so as to accommodate the rest to flasks of different depths. There are, of course, connections for conveying appropriate fluid, as air, to the various cylinders and to the vibrator. Air is conveyed to the cylinder 6 by way of the connection 29. There is in this connection a valve 30, which when depressed admits air to the cylinder and which when elevated cuts off the supply of air to the cylinder 6 and connects its interior with the atmosphere by way of an exhaust opening 31. This valve is in effect made in two parts, each normally elevated. In this position an upward projection 32 on the lower part clears the exhaust opening 31, but when the upper part of the valve is depressed this projection closes the exhaust opening and serves as a means by which the upper part in descending pushes down the lower part.

33, is a lever for working the valve which controls the cylinder 6 and this lever is provided with laterally extending projections 34 Fig. 2 which coöperate with a segment 35 carried by the side bar e of the ramming head Fig. 4 so that the lever and consequently the valve is of necessity operated at the proper time and in the proper manner.

In Fig. 4 the connection between the side bar of the ramming head and the segment is shown at y. The lever is also provided with auxiliary handles 36 and 41 which control the valved connections 37 of the cylinders 14 and the connections 38 of the vibrator 17. The auxiliary handles 36 and 41 may be connected with a common center-piece pivoted to the handle 33 and this center-piece pushes the spindles of the valves of the connections 37 and 38. The segment 35 clears the upper laterally extending lug 34 Fig. 4, by being out of range of its end and permits the main operating valve to be opened freely when the yoke or ramming head 1 is up in position to squeeze a mold and at the same time the mold may be jarred by dropping the plunger 5, before the mold comes in contact with the ramming block 3. The segment 35 also prevents the main operating valve from being opened freely when the yoke is thrown back because the segment underlies the laterally extending lug, but permits it to be opened very slightly to draw a pattern. For this latter purpose, clearance is provided between the faces of upper lug 34 and of the segment. As the pattern is being thus drawn, the thumb-latch 41 is depressed to start the vibrator. The lower lug 34 works under the segment and limits the upward movement of the lever 33. Finger latch 36 controls the admission and exhaust from roll-over cylinders 14.

39, are guide pins connected with the flask support and adapted to work through eyes 42 connected with the cylinder 6. Springs 40 may be provided for cushioning the movements of the flask support in respect to the piston 5.

The operation of the machine may be described as follows: The frame 10 is turned into the position shown in Figs. 2 and 3, so that the pattern board or pattern carrier and the flask a are supported on the head 8. The frame 10 may also rest on the head 8. The flask is then filled with sand and if it is to be squeezed or rammed, the head 3 is turned up into place and the piston and cylinder 5 and 6 are actuated either to squeeze the sand against the part 3 or to ram it against the part 3 by the repetition of a number of impacts. The head 8 can be made to rise and fall rapidly and thus jar the sand. After the sand has been rammed in any of these ways it is struck off and the bottom board is applied and clamped by the clamp 16, which also clamps the pattern board, half-flask and bottom board and frame 10 together. The head is in the position shown in the drawings and the piston and cylinders 13 and 14 are operated so as to turn the frame 10 into the position shown in Fig. 4, in contact with its stop 12 with the flask on the support 9. The piston and cylinder 5 and 6 are then actuated slowly, while the vibrator 17 is in operation, thus drawing the pattern from the sand. The flask A is then removed and the described operation repeated, use being made, if desired, of the pistons and cylinders 13 and 14 for turning over the frame 10 and pattern carrier and patterns into the position first described.

What I claim is:

1. The combination of a cylinder and piston constituting a flask support, a flask rest, flask carrying arms pivoted to the piston and adapted to swing the flask from the support to the rest, complemental pistons and cylinders interposed between the arms and the first mentioned piston for turning the former, stops for positioning the arms to draw the patterns, and connections for the cylinders, substantially as described.

2. The combination of a cylinder and piston constituting a flask support, a flask rest, flask carrying arms pivoted to the piston and adapted to swing the flask from the support to the rest, complemental pistons and cylinders interposed between the arms and the first mentioned piston for turning the former, stops for positioning the arms to draw the patterns, connections for the cylinders, and a ramming head, substantially as described.

3. In a molding machine the combination of a piston, fluid connections for the piston, a pattern frame marginally hinged to the piston, stops interposed between the frame and piston and movable with the latter, and power means for turning the pattern frame, substantially as described.

4. In combination a power roll-over molding machine including a marginally hinged frame and frame stops and means for turning the frame, a movable piston with which the frame and means and stops are connected and on which said machine is mounted, a cylinder for actuating the piston, connections for the cylinder, and a ramming head, substantially as described.

5. In combination a power roll-over molding machine including a marginally hinged frame and frame stops and means for turning the frame, a movable piston with which the frame and means and stops are connected and on which said machine is mounted, a cylinder for actuating the piston, connections for the cylinder, and a flask rest carried by the cylinder, substantially as described.

6. In combination a power roll-over molding machine including a marginally hinged frame and frame stops and means for turning the frame, a movable piston with which the frame and means and stops are connected and on which said machine is mounted, a cylinder for actuating the piston, connections for the cylinder, a flask rest carried by the cylinder, and a ramming head, substantially as described.

7. In combination a power roll-over molding machine, a movable piston on which said machine is mounted, a cylinder for the piston, a flask rest afforded a range of vertical motion, and adjustable means for cushioning the flask rest, substantially as described.

8. In combination a power roll-over molding machine, a movable piston on which said machine is mounted, a cylinder for the piston, a flask rest, and a bracket having adjustable connection in respect to the cylinder and adapted to support the rest, substantially as described.

9. In combination a power roll-over molding machine, a movable piston on which said machine is mounted, a cylinder for the piston, a flask rest, a bracket having adjustable connection in respect to the cylinder, and an adjustable spring interposed between the flask rest and bracket, substantially as described.

10. In a molding machine, a flask carrier, and fluid pressure means for jolting the same and for rocking such carrier to its stripping position.

11. In a molding machine, a flask carrier, and pneumatic means for jolting the same and for rocking such carrier to its stripping position.

12. In a molding machine, a flask supporting member, and pneumatically operated mechanism to jolt said member and to swing it in a vertical plane into a stripping position.

13. In a molding machine, the combination with a flask carrier mounted to swing in a vertical plane to invert the flask, of pneumatically actuated mechanism connected with said carrier to jolt the flask and to then effect the swinging or rocking over thereof.

14. In a machine of the character described, the combination of a vertically reciprocable plunger provided with a top constituting a filling stand, means for reciprocating said plunger to jar said stand, a pattern holder pivotally attached to one edge of said stand, and a member similarly pivotally attached to said stand for detachably securing a mold to said holder.

15. In a machine of the character described, the combination with a parting stand; of a vertically reciprocable plunger adjacent thereto and provided with a top constituting a filling stand; means for reciprocating said plunger to jar said stand; a pattern plate holder pivotally attached to one edge of said stand and adapted to be swung over in reverse position onto said parting stand; and a member likewise pivotally attached to said parting stand for detachably securing a mold to said holder.

In testimony whereof I have hereunto signed my name.

WILFRED LEWIS.

Witnesses:
 CLIFFORD K. CASSEL,
 K. M. GILLIGAN.